US008347900B2

(12) United States Patent
Jensen et al.

(10) Patent No.: US 8,347,900 B2
(45) Date of Patent: Jan. 8, 2013

(54) WIND TURBINE FLUID APPLICATION APPARATUS

(76) Inventors: Dustin Jensen, Draper, UT (US); Broque L. Fraughton, Evanston, WY (US); Sonny K. Fraughton, Evanston, WY (US)

( * ) Notice: Subject to any disclaimer, the term of this patent is extended or adjusted under 35 U.S.C. 154(b) by 0 days.

(21) Appl. No.: 13/080,297

(22) Filed: Apr. 5, 2011

(65) Prior Publication Data

US 2012/0258252 A1 Oct. 11, 2012

(51) Int. Cl.
B08B 3/02 (2006.01)
(52) U.S. Cl. ......... 134/172; 134/180; 134/198; 134/199
(58) Field of Classification Search .................... None
See application file for complete search history.

(56) References Cited

U.S. PATENT DOCUMENTS

| 4,962,560 | A | 10/1990 | Moore |
| 5,352,297 | A | 10/1994 | Peters |
| 6,431,224 | B1 * | 8/2002 | Fry .................................. 141/8 |
| 2005/0042102 | A1 | 2/2005 | Teichert |
| 2006/0054202 | A1 | 3/2006 | Luke et al. |
| 2006/0175465 | A1 | 8/2006 | Teichert |
| 2007/0056801 | A1 | 3/2007 | Iverson |
| 2007/0283984 | A1 * | 12/2007 | Fratello et al. .................. 134/43 |
| 2009/0169734 | A1 | 7/2009 | Teichert |
| 2010/0018551 | A1 | 1/2010 | Gallegos |
| 2010/0132137 | A1 * | 6/2010 | Eggleston ...................... 15/21.1 |
| 2010/0132738 | A1 | 6/2010 | Kumar et al. |
| 2011/0088723 | A1 | 4/2011 | Jensen |

FOREIGN PATENT DOCUMENTS

| JP | 2005-211885 | 8/2005 |
| JP | 2008-309098 | 12/2008 |

OTHER PUBLICATIONS

U.S. Appl. No. 12/582,287, filed Oct. 20, 2009; Dustin Jensen; office action issued Nov. 15, 2011.
PCT Application PCT/US2010/061595; filed Dec. 21, 2010; Dustin Jensen; International Search Report mailed Sep. 15, 2011.

(Continued)

*Primary Examiner* — Michael Kornakov
*Assistant Examiner* — Ryan Coleman
(74) *Attorney, Agent, or Firm* — Thorpe North & Western LLP

(57) ABSTRACT

A wind turbine tower cleaning or coating apparatus is provided. The apparatus includes a frame which circumferentially extends at least partially around a wind turbine tower. A separator structure can be attached to the frame and extends between the frame and the wind turbine tower to position the frame at a predetermined distance away from the wind turbine tower. The separator structure can also include an attachment end which is attached to the frame and a slidabe end positionable near the wind turbine tower. A slider can be attached to the slidabe end of the separator structure and can slide on the surface of the wind turbine tower as the frame is raised and lowered on the wind turbine tower. A frame lift device can raise and lower the frame on the wind turbine tower. A plurality of sprayers can be positioned circumferentially along the frame and configured to selectively spray fluid onto the wind turbine tower. In one embodiment, a hoist device is attached to the frame to hoist the wind turbine cleaning or coating device vertically up and down the wind turbine tower.

10 Claims, 7 Drawing Sheets

OTHER PUBLICATIONS

U.S. Appl. No. 12/582,287, filed Oct. 20, 2009; Dustin Jensen; office action dated Jul. 9, 2012.
U.S. Appl. No. 12/528,287, filed Oct. 20, 2009; Dustin Jensen; notice of allowance dated Sep. 26, 2012.
PCT/US12/31591; international filing date Mar. 30, 2012; Dustin Jensen; International Search Report dated Jul. 20, 2012.
U.S. Appl. No. 13/167,294, filed Jun. 23, 2011; Dustin Jensen; office action dated Aug. 28, 2012.

* cited by examiner

WIND TURBINE FLUID APPLICATION APPARATUS

BACKGROUND

Wind turbines are increasing in prominence and popularity as a source of clean energy production. Wind currents can cause blades of a wind turbine to rotate, converting the kinetic energy of the rotating blades into usable electrical or mechanical energy.

Wind turbines are often erected in areas having few obstacles obstructing wind currents to maximize a potential energy output. Such areas are sometimes remote and may be accessed only by traversing poorly maintained roads. This can present some difficulty in accessing the wind turbine for maintenance and other operations. Various types of maintenance may be performed on wind turbines. Maintenance of outer components of the wind turbines, such as the wind turbine blades or the surface of the wind turbine tower, becomes increasingly difficult as a size of wind turbines increases in attempts to generate more energy.

Repairs and cleaning are some of the more common maintenance issues facing owners of wind turbines. Maintenance of wind turbines often involves periodic lifting or lowering of wind turbine parts, equipment, maintenance personnel, etc. Some specific examples of maintenance operations involving lifting or lowering of objects include inspection of the wind turbine blades, cleaning the wind turbine blades and tower, replacement of parts, such as wind turbine blades, etc.

Prior maintenance systems have generally utilized free-standing cranes or other forms of lifts to lift and/or lower objects in connection with maintenance or repair of outer components of wind turbines. However, due to the difficulty in accessing wind turbines because of location, transportation of the cranes or lifts to the wind turbines can be difficult, costly, and time consuming.

Wind turbine cleaning is generally performed on a periodic or regular basis. Cleaning wind turbine blades and tower supports can be useful for a variety of purposes, such as maintaining an efficiency of the wind turbine, extending a useful life of the blades and towers, maintaining a clean, well-maintained appearance, etc. Wind turbines are sometimes cleaned as frequently as two or more times per year.

Over relatively short periods of use (such as a matter of weeks or months), wind turbines can become defiled by dust, coatings of salt, dead insects, bird excrement and other surface deposits. Wind turbine defilement can reduce the efficiency, worsen an appearance, and lead to corrosive and other detrimental effects on the wind turbine surfaces. A sealant can be applied to wind turbine surfaces for additional protection. However, application of the sealant may still involve difficulties and hazards similar to those encountered in cleaning or performing other maintenance. Further, the sealant may also need to be periodically re-applied and the use of a sealant generally does not prevent or reduce defilement of wind turbine surfaces.

Because of various factors such as the size and location of wind turbines, cleaning and other maintenance can be a difficult and time-consuming process. Further, wind turbine maintenance can be hazardous for maintenance workers. Accordingly, there is a need for wind turbine cleaning and maintenance which is simpler, faster, and which allows for a safer and more stable condition for maintenance workers.

SUMMARY

The present disclosure relates to an apparatus and method for lifting and/or lowering of objects in connection with a wind turbine or a similar construction. The disclosure also relates to devices, systems, and methods for cleaning or coating (e.g., protective coating or paint) a wind turbine or similar construction.

A wind turbine tower cleaning or coating apparatus is provided, in accordance with an embodiment of the present disclosure. The apparatus can include a frame configured to circumferentially extend at least partially around a wind turbine tower; a separator structure attached to the frame and configured to extend between the frame and the wind turbine tower to position the frame a predetermined distance away from the wind turbine tower, the separator structure comprising an attachment end attached to the frame and a traversing end positionable near the wind turbine tower; a slider or roller attached to the traversing end of the separator structure and configured to slide or roll, respectively, along the surface of the wind turbine tower as the frame is raised and lowered on the wind turbine tower; a frame lift device configured to raise and lower the frame on the wind turbine tower; and a plurality of sprayers positioned circumferentially along the frame and configured to selectively spray fluid onto the wind turbine tower.

In another embodiment, a wind turbine lift apparatus can comprise a frame configured to circumferentially extend at least partially around a wind turbine tower; a slider or roller attached to the frame and configured to slide or roll, respectively, on the surface of the wind turbine tower as the frame is raised and lowered on the wind turbine tower; and a hoist attached to the frame and configured to raise and lower the frame on the wind turbine tower. The frame can include a frame expansion member coupled to the frame and configured to allow expansion and contraction of a circumference of the frame; and a restraining device extending between the frame and the frame expansion member and configured to cause the frame to expand and contract based on a diameter of the wind turbine tower.

In another embodiment, a method for cleaning, treating, or painting a wind turbine tower can comprise positioning a frame at least partially around a circumference of a wind turbine tower, wherein the frame comprises a plurality of sprayers; moving the frame along a height of the wind turbine tower; and spraying a fluid onto the tower from only a first portion of the plurality of sprayers as the frame is moved essentially vertically along the wind turbine tower. In this embodiment, the method can further comprise the step of spraying the fluid onto the tower from a second portion of the plurality of sprayers. This step can further include the additional step of shutting off one or more sprayer from the first portion of the plurality of sprayers. As with some other embodiments herein, the method can further comprise using a hoist attached to the frame to move the frame along the wind turbine tower.

DETAILED DESCRIPTION

Figure 1:
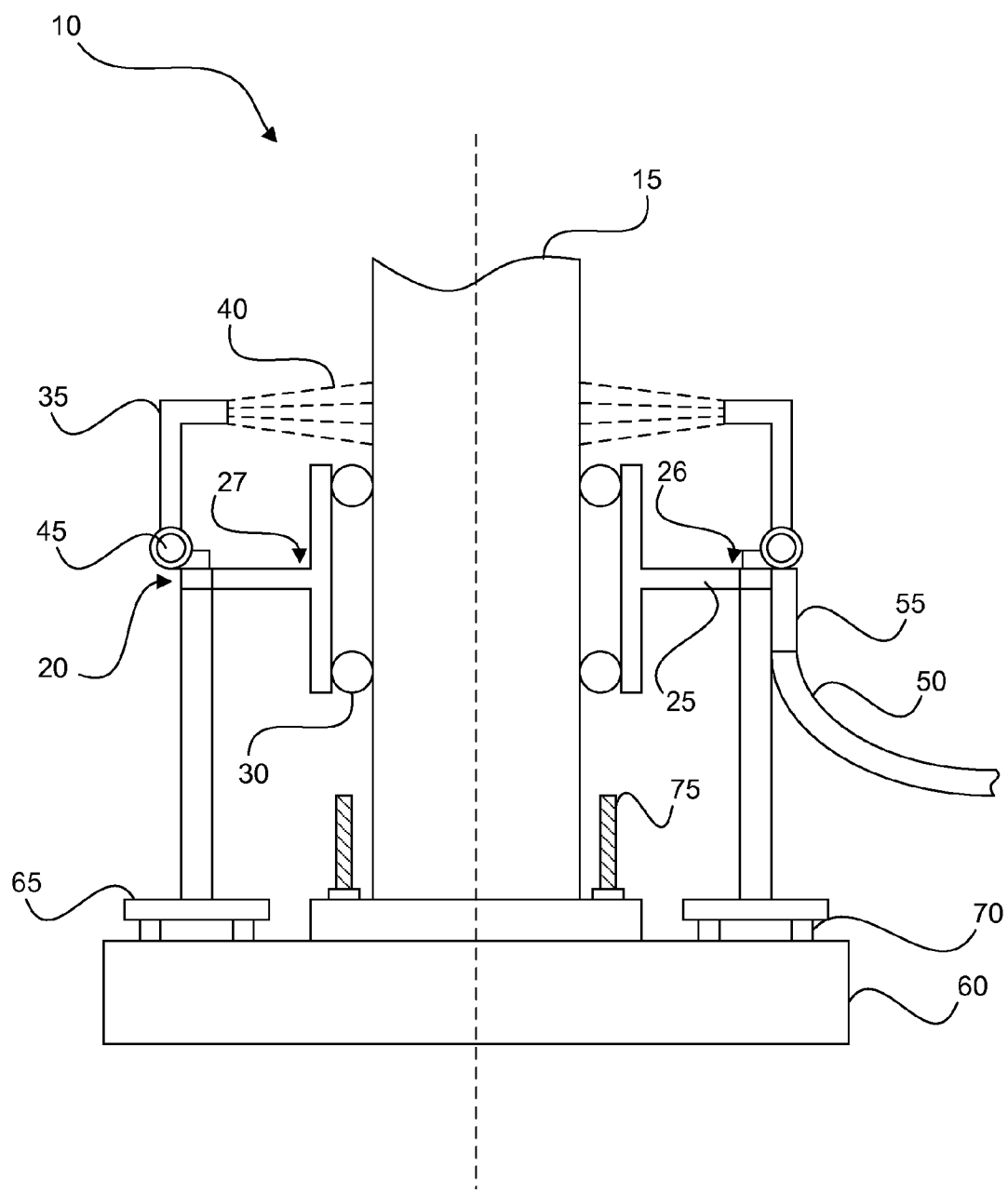
FIG. 1 is a cross-sectional side view of a portion of a wind turbine cleaning or coating apparatus positioned around a wind turbine tower, in accordance with an embodiment of the present disclosure.

Reference will now be made to the exemplary embodiments illustrated, and specific language will be used herein to describe the same. It will nevertheless be understood that no limitation of the scope of the invention is thereby intended. Additional features and advantages of the invention will be apparent from the detailed description which follows, taken in conjunction with the accompanying drawings, which together illustrate, by way of example, features of the invention.

Wind turbine maintenance and cleaning has been attempted by using large cranes and lift apparatuses. However, as has been described, the use of such devices can present difficulties in terms of access, expense, etc. Other systems have been used which attempt to reduce difficulties of access by removing or reducing the need for transporting large and heavy equipment to wind turbine sites. For example, skilled climbers may use ropes to traverse a side of a wind turbine tower or blade. However, a lack of climbing experience can be hazardous to maintenance workers and some issues with maintenance and repair are not easily addressed by an individual on a rope on the side of the wind turbine tower. Particularly when large or heavy parts are involved for installation, repairs, etc., an individual on a rope may have significant difficulty in performing the maintenance operations. Another system for maintenance and cleaning involves the installation of a crane and a cable basket underneath the nacelle of the wind turbine which allows the basket to be lowered down the side of the wind turbine. However, the basket can be difficult to position correctly and difficult to work from due to an unstable nature.

Regardless of the approach to maintenance and cleaning, virtually all prior systems have still involved significant manual labor. The wind turbine blades are generally brought to a halt and workers are raised or lowered to various positions on wind turbine towers or blades in order to clean a particular section of the wind turbine. After workers have finished working at one portion of the wind turbine, they may be raised or lowered to another portion or even may be repositioned at different positions around the wind turbine circumference to be able to clean the wind turbine on all sides from the top to the bottom. Providing cleaning means to the workers can be difficult. Positioning and re-positioning the workers can be time-consuming and difficult. Cleaning using prior methods can take up to several weeks to complete and can be very costly. Furthermore, some wind turbines are located at sea, which can increase difficulty and cost in cleaning even further.

To reduce a cost, cleaning time, difficulty, and hazardousness of wind turbine cleaning, a wind turbine tower cleaning or coating apparatus is provided, in accordance with an embodiment. The apparatus includes a frame. The frame can circumferentially extend at least partially around a wind turbine tower. A separator structure, such as a beam, can be attached to the frame. The separator beam can extend between the frame and the wind turbine tower to position the frame at a predetermined distance away from the wind turbine tower. The separator beam can also include an attachment end which is attached to the frame and a traversing end positionable near the wind turbine tower. A slider or roller can be attached to the traversing end of the separator structure. The slider or roller can slide (or roll) on the surface of the wind turbine tower as the frame is raised and lowered on the wind turbine tower. The apparatus can also include a frame lift device. The frame lift device can raise and lower the frame on the wind turbine tower. The apparatus also includes a plurality of sprayers positioned circumferentially along the frame and configured to selectively spray fluid onto the wind turbine tower. Fluids that can be applied include cleaning solution, treatment solution, water, paint, etc. to clean or otherwise treat the wind turbine tower.

In another embodiment, a wind turbine lift apparatus can comprise a frame configured to circumferentially extend at least partially around a wind turbine tower, a slider or roller attached to the frame and configured to slide or roll, respectively, on the surface of the wind turbine tower as the frame is raised and lowered on the wind turbine tower, and a hoist attached to the frame and configured to raise and lower the frame on the wind turbine tower. The frame can further comprise a frame expansion member coupled to the frame and configured to allow expansion and contraction of a circumference of the frame, and a restraining device extending between the frame and the frame expansion member and configured to cause the frame to expand and contract based on a diameter of the wind turbine tower.

Related methods are also disclosed herein as will be described in more detail hereinafter.

It is noted that in describing the apparatus, systems, and methods herein, emphasis is placed on cleaning and rinsing embodiments. This is done for purposes of clearly describing the apparatus, and not to disclaim embodiments where each fluid is not specifically described. Thus, it is noted that in each case where cleaning is described, painting or surface treating embodiments are expressly included in such discussions, and vice versa. Any minor modifications that could be used to accomplish this are included herein, and could include, for example, replacing the cleaning solution with paint or other surface treatment composition, modifying hosing or sprayers to facilitate the use of a different fluid (paint sprayers used rather than cleaning sprayers), modifying positioning of sprayers to enable appropriate coverage, etc. Such modifications would be apparent to one skilled in the art after considering the present disclosure.

Referring to FIG. 1, a system, indicated generally at 10, provides an example for cleaning, treating, painting, etc., a wind turbine tower 15. More specifically, FIG. 1 provides a cross-sectional schematic side view of a wind turbine cleaning or coating apparatus positioned around the wind turbine tower. The dashed line extending vertically through the wind turbine tower indicates that the wind turbine tower may actually be much larger in size comparatively to the cleaning system. For example, the wind turbine tower may be tens of feet in diameter at the base. In contrast, a cross-sectional width of a portion of the apparatus, such as that shown on the left side of the tower, may be much smaller, such as ranging from 1 to 4 feet in width at a widest point, depending on a particular configuration. The size of the apparatus can also vary from much smaller or larger sizes as well. Additionally, it is noted that the drawings provided in FIG. 1 and other FIGS. are not considered to be to scale.

The system 10 includes a frame 20. The frame can be constructed from any suitable material. For example, wood, plastic, metal, fiberglass, etc. may be used to construct the frame. In one aspect, to provide a sturdy, strong, rigid construction, metal may be used. To lighten the frame, the metal may be also hollow, as long as it is strong enough to provide appropriate support to function as described herein. In one aspect, the metal used to construct the frame may be steel or a steel alloy. Other metal materials or non-metal materials may also be used. In one aspect, the frame can be constructed by welding a plurality of frame pieces together to form the frame. The frame can be constructed so as to circumferentially extend at least partially around a wind turbine tower 15. In some embodiments, the frame is constructed to circumferentially extend completely around a wind turbine tower.

The frame 20 can include a separator structure, which in this embodiment is a separator beam 25. The separator beam can be attached to the frame. The separator beam may be integrally formed with the frame, permanently attachable to the frame, or removably attachable to the frame. The separator beam can extend between the frame and the wind turbine tower 15 to position the frame at a predetermined distance away from the wind turbine tower. As will be described in additional detail below, sprayers 35 may form a part of the system. Positioning the frame at a predetermined distance away from the wind turbine tower can enable the sprayers to spray fluid over a larger area of the wind turbine tower than if the sprayers were directly adjacent to the wind turbine tower. A length of the separator beam can vary between embodiments. In one aspect, the length of the separator beam can be determined according to a swath of a fluid spray from the sprayer. In other words, the separator beam can be determined according to an optimal spraying distance for the sprayers. Too large of a length of the separator beam may result in not applying a sufficient amount of fluid from the sprayer to the tower or that the sprayer cannot adequately spray the fluid onto the tower. Too small of a length of the separator beam may result in not providing the coverage of fluid on the tower as may be desired or may necessitate an increase the number of sprayers around the frame, thus increasing a cost. Also, when increasing a number of sprayers, a fluid pressure may also be increased to achieve desired spraying performance.

While the frame 20 in FIG. 1 is shown as including a separator beam 25, the separator need not be strictly limited to a beam structure or shape. Any variety of structures or shapes may also be used which provides a desired separation of the frame from the wind turbine tower 15. Also, while the frame and the separator beam are illustrated as being attached or formed together, the vertical portion of the frame shown in the figure may be omitted and the separator beam together with a member for supporting the sprayers 35 may comprise the frame. In other words, the frame can be any suitable shape, size, or configuration capable of supporting sprayers at a desired distance away from the wind turbine tower.

The vertical frame portion shown in FIG. 1 can be useful for supporting the apparatus on the ground or for resting the apparatus against a surface 60 below the apparatus. For example, the vertical portion of the frame can help hold the apparatus at a desired distance above the ground for inspection or maintenance of the apparatus or to avoid obstructions. For example, a wind turbine tower 15 may have a number of large bolts 75 extending upward through a base of the tower from a concrete base. The vertical frame member can hold the sprayers 35, the separator beam 25, and other members above the bolts so that the bolts do not obstruct operation or set up of the apparatus around the wind turbine tower. The vertical member can also prevent damage to the sprayers, the separator beam, and so forth by preventing contact with the bolts, the ground, or other obstructions. The vertical frame member can include a frame base 65. The frame base can help support the frame against the ground. The frame base may further comprise base support members 70. In one aspect, the base support members may be a flexible or deformable material, such as rubber or the like, to absorb an impact with the ground when the frame is lowered on the ground, particularly if a descent of the frame is a rapid descent. In another aspect, the base support members may comprise rollers, such as wheels, which enable the apparatus to be wheeled along the ground to a desired destination.

As described above, the frame 20 can circumferentially extend completely or partially around a wind turbine tower 15. Where the frame extends only partially around the wind turbine tower, the frame may include an opening by which the frame may be placed adjacent to and partially around the wind turbine tower. Also, where the frame does not completely extend around the wind turbine tower, steps can be taken to clean around a full circumference of the wind turbine tower. For example, the apparatus may be rotated around a tower as the apparatus moves along a height of the tower, or the apparatus may be used multiple times on the tower to effect cleaning of multiple faces of the tower circumference. As another example solution, although the frame may not fully extend around the tower, the sprayers may be configured to still provide sufficient coverage of fluid on the tower that a full encompassment of the tower by the frame is not required.

Regardless of whether the frame 20 completely or partially extends around the wind turbine tower 15, the frame may be capable of being assembled and disassembled. The frame can be transported to a wind turbine tower in a disassembled state on a utility vehicle. The frame can be assembled at and/or around the wind turbine tower. The apparatus can then be used to clean the wind turbine tower. After cleaning, the apparatus and/or frame can be disassembled, loaded onto the vehicle, and taken to another destination.

Referring again to the separator beam 25, the separator beam can include an attachment end 26 attached to the frame 20 and a traversing end 27 positionable near the wind turbine tower 15. The traversing end can be operatively attached to one or more sliders or rollers 30, for example. Sliders can be configured to slide on the surface of the wind turbine tower as the frame is raised and lowered on the wind turbine tower. Various types of sliders are contemplated. Any suitable device or structure which allows the frame to be supported against the wind turbine tower and be raised or lowered along a height of the tower while causing little or no damage to the surface of the wind turbine tower may be used as a slider. Preferably the sliders enable the frame to be smoothly raised and lowered along the height of the tower. In one aspect, a rolling device, such as a wheel, can be used. One or more sliders or rollers may be positioned at a traversing end of each of the separator beams. In one aspect, the separator beam further comprises a beam member to enable positioning a plurality of sliders at the traversing end with a predetermined distance between the sliders. In one aspect the beam member may be vertically or horizontally oriented positioning sliders thereon with a distance therebetween can provide additional support of the frame against the tower. A vertically oriented beam member can help maintain a desired spraying direction or orientation from the sprayers 35 to the tower.

The sprayers 35 can be attached to the frame 20. The sprayers may be removably attached or permanently attached. In one aspect, the sprayers may even be integrally formed with the frame. The sprayers may comprise any suitable spraying device capable of spraying a desired fluid 40 onto the wind turbine tower 15. The sprayers illustrated in FIG. 1 include a vertical section to provide clearance of the spray nozzle section above the vertically oriented beam member when fluid is sprayed from the spray nozzle section. However, the sprayers may comprise any desired configuration and may spray fluid from any desired position with respect to the frame and/or the tower or at any desired direction towards the tower. In one aspect, the apparatus may be implemented with a single sprayer, but due to a size of the circumference of the wind turbine tower, a single sprayer may not adequately spray fluid to an entire tower surface without rotations and multiple hoisting and lowering of the apparatus. Typically, the apparatus may comprise a sufficient number of sprayers that the tower can be sufficiently sprayed with fluid in one or two passes up or down the wind turbine tower.

The sprayers 35 can be interconnected such that all of the sprayers receive and spray fluid 40 from a common fluid supply. A fluid pipe 45 can extend between each of the sprayers to provide fluid to the sprayers. Fluid 40 may be supplied to the fluid pipe through a fluid hose 50. The fluid hose may in turn be connected to a fluid reservoir. In one aspect, the fluid reservoir may be a fluid tank carried by a utility vehicle to the site of the wind turbine tower. The fluid hose can attach to the fluid pipe at a hose attachment section 55. The hose attachment section can securely attach the hose to the fluid pipe to supply fluid to the sprayers, even when the frame is raised high up against the tower and a weight of the fluid hose pulls at the attachment section.

In one aspect, the sprayers can be configured to spray a cleaning or treatment solution, or even a tower surface sealing solution or paint. In another aspect, the sprayers can be configured to spray a high pressure rinse, such as a water rinse or other dilute rinsing solution, onto the tower surface. In one example embodiment, the sprayers can spray a cleaning or treatment solution while the frame is raised along a height of the tower and the sprayers can spray a rinse while the frame is lowered along the height of the tower to rinse off the cleaning solution. In this manner, an entire wind turbine tower surface may be cleaned in a single up-down cycle of raising and lowering the apparatus. No maintenance workers need be present on the apparatus. An entire wind turbine tower can be cleaned in a matter of hours, as opposed to the days or weeks spent cleaning using previous cleaning methods. The apparatus does not involve putting maintenance workers in precarious or hazardous positions. The apparatus can save a substantial amount of time and money and provide a simple, safe, and effective means of quickly cleaning wind turbine towers.

Figure 2:
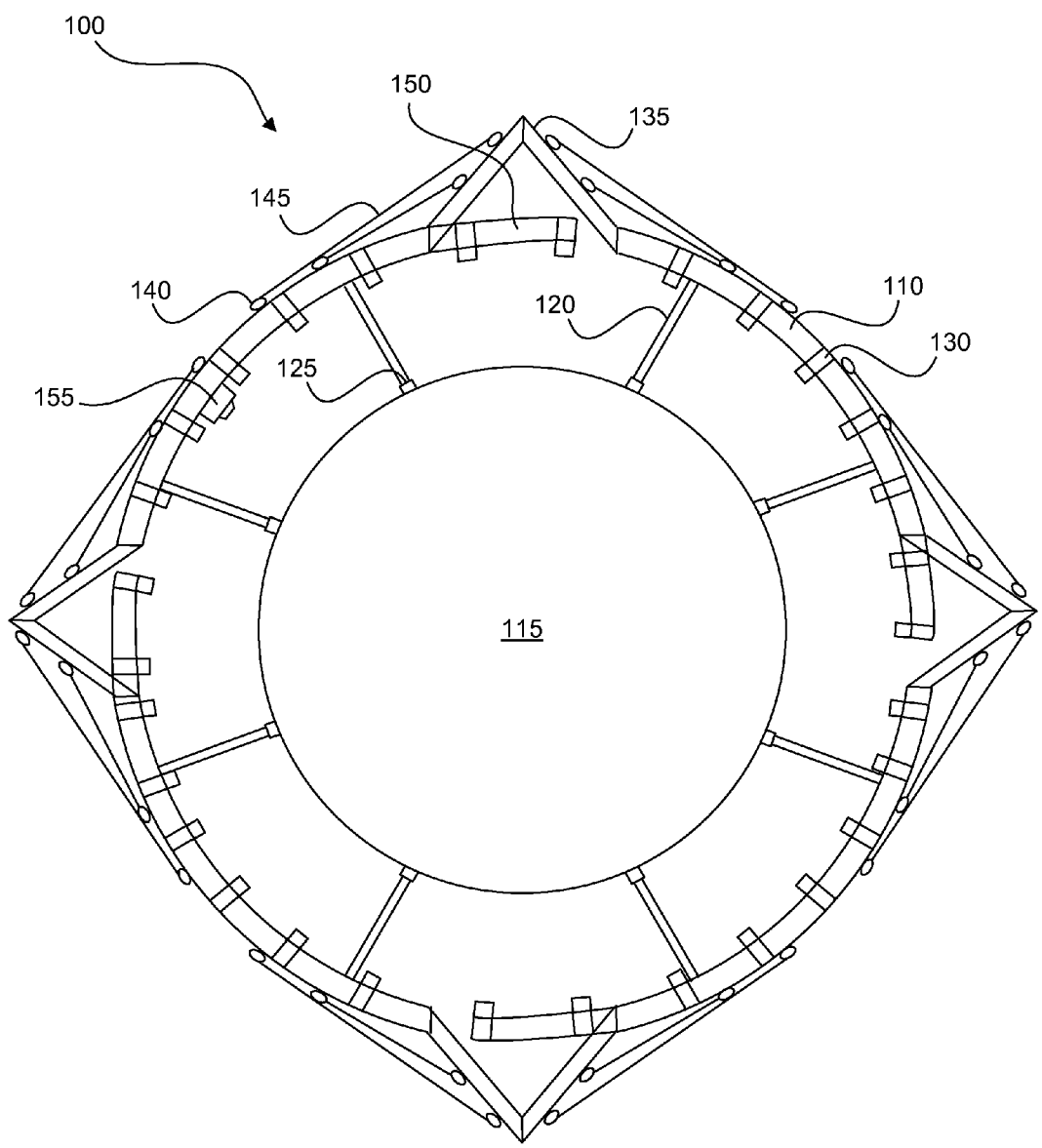
FIG. 2 is a top view of a wind turbine tower cleaning or coating apparatus with pivoting expansion members, in accordance with an embodiment of the present disclosure.

Reference will now be made to FIG. 2. FIG. 2 illustrates a top view of a wind turbine tower cleaning or coating apparatus 100 with pivoting expansion members, in accordance with an embodiment of the present disclosure. The wind turbine tower cleaning or coating apparatus of FIG. 2 is similar in many regards to the apparatus 10 illustrated in FIG. 1. The apparatus of FIG. 2 includes a frame 110 which circumferentially extends around a wind turbine tower 115. Separator structures 120, e.g., beams or other structures, and sliders/rollers 125 can respectively enable positioning of the frame at a distance away from the tower and sliding of the frame along a height of the tower. Sprayers 130 can be used to spray fluid onto the wind turbine tower to clean the tower.

The apparatus 100 of FIG. 2 further includes a plurality of pivot frame members 135 extending outwardly from the frame away from a position of the wind turbine tower. However, inwardly pivoting frame members may also be used. Many wind turbine towers progressively narrow in diameter from a bottom portion of the tower to the top portion of the tower. Providing a frame member capable of circumferentially expanding or contracting to adjust to the diameter and/or circumference of the wind turbine tower can allow for adequate cleaning capabilities and maintaining stability of the apparatus against the tower. The apparatus can include a plurality of pivots operable attaching the pivot frame members to the frame to enable pivoting.

A restraining device 145 can extend between the frame 110 and at least one of the pivot frame members 135 and can cause the frame to expand and contract based on a diameter of the wind turbine tower 115. In one aspect, the restraining members may be elastomeric or spring members. The restraining members can be attached to the frame and the pivot frame members at restraining member attachment sections 140. In one aspect, the restraining members may be bungee cords and the restraining member attachment sections may be a loop by which hooks on the end of the bungee cords can attach to the frame and the pivot frame members. Springs or other mechanical tensioning devices can alternatively be used. As the apparatus 100 is lowered along the tower 115, the pivot frame members pivot inwardly to allow for expansion of the frame to accommodate a wider diameter of the tower. As the apparatus is raised along the tower, the pivot frame members pivot outwardly to allow for contraction of the frame to accommodate a smaller diameter of the tower. As the frame expands the restraining members may be stretched. As the frame is raised along the tower, the tension in the restraining members pulls on the pivot frame members causing them to pivot outwardly, operably reducing or contracting a circumference of the frame corresponding to a smaller wind turbine tower diameter.

The sprayers 130 can be mounted on support members 150, which can be configured to hold the sprayers in a position such that regardless of a degree of expansion of contraction of the circumference of the frame, the apparatus is still capable of providing adequate fluid coverage to the wind turbine tower. The sprayer support member can be configured in such a way that neither the sprayers nor the sprayer support members hinder the expansion or contraction of the frame. For example, in some embodiments the sprayer support member can be aligned differently from the frame such that during contraction of the frame the sprayer support member and the sprayers on the sprayer support member do not come in contact with a portion of the frame to which the sprayer support member is not attached or to other sprayers associated with that portion of the frame.

It is noted that one or more camera(s) 155 can be mounted on the frame 110 or other structure to monitor the cleaning, the sprayer nozzles 130, the location of the blade (not shown) in relation to the turbine tower 115, etc. Though the camera is not shown in other embodiments, the camera can be applied to each embodiment of the present disclosure and configured as described herein. For example, the camera can be configured to provide video or still images, depending on the desired application. Also, the camera or multiple cameras can have a fixed position, or can be actionable to pan, zoom, tilt, etc., either automatically, or by remote control.

Figure 3:
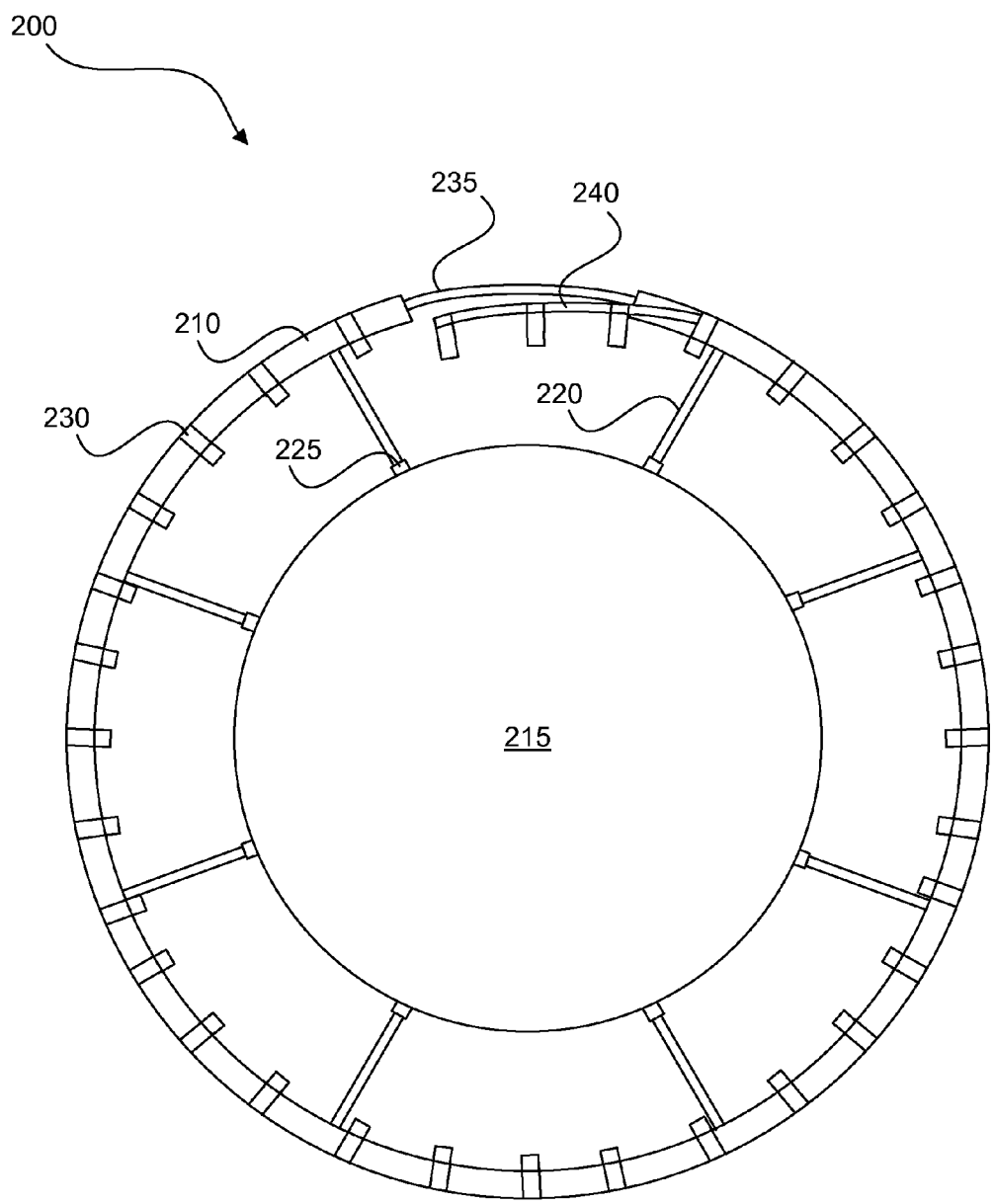
FIG. 3 is a top view of a wind turbine tower cleaning or coating apparatus with spring-loaded expansion members, in accordance with an embodiment of the present disclosure.

Reference will now be made to FIG. 3, which is a top view of a wind turbine tower cleaning or coating apparatus with spring-loaded expansion members, in accordance with an embodiment of the present disclosure. The wind turbine tower cleaning or coating apparatus of FIG. 3 is similar in many regards to the apparatus 10 illustrated in FIG. 1 or the apparatus 100 illustrated in FIG. 2. The apparatus 200 of FIG. 3 includes a frame 210 which circumferentially extends around a wind turbine tower 215. Separator structures, such as separator beams 220 and sliders/rollers 225 can respectively enable positioning of the frame at a distance away from the tower and sliding of the frame along a height of the tower. Sprayers 230 can be used to spray fluid onto the wind turbine tower to clean the tower.

The apparatus 200 of FIG. 3 further includes a frame expansion member 235 coupled to the frame and configured to enable an expansion and contraction of a circumference of the frame. Broadly speaking, such a description also describes the embodiment of FIG. 2 as well as other configurations. Speaking more specifically regarding FIG. 3, the frame expansion member enables telescopic or similar lengthening or reducing of the frame size such that the frame circumference is expandable and contractable. (With respect to telescoping, one member can pass into an opening of an adjacent member, or alternatively, one member can pass just next to an adjacent member, both actions being considered telescoping). In other words, the frame can expand and contract as has been described with regards to FIG. 2, except the expansion and contraction is accomplished using a frame expansion member telescopically extending from and within the frame. A restraining device can extend between the frame and the frame extension member. The restraining device can cause the frame to expand and contract based on a diameter of the wind turbine tower. The restraining device may comprise at least one of a spring member and an elastic member. For example, the restraining device may be attached to an inside portion of the frame and to an end of the frame expansion member.

The apparatus of FIG. 3, similar to that in FIG. 2, can utilize a fluid pipe or a sprayer support member 240 to support one or more sprayers away from the frame and/or the telescoping frame members. The sprayer support member can hold the sprayers in a position such that regardless of a degree of expansion of contraction of the circumference of the frame, the apparatus is still capable of providing adequate fluid coverage to the wind turbine tower. The sprayer support member can be configured in such a way that neither the sprayers nor the sprayer support members hinder the expansion or contraction of the frame. For example, in some embodiments the sprayer support member can be aligned differently from the frame such that during contraction of the frame the sprayer support member and the sprayers on the sprayer support member do not come in contact with a portion of the frame to which the sprayer support member is not attached or to other sprayers associated with that portion of the frame.

FIG. 3 illustrates only a single frame expansion section on the frame.

However, any number of desired frame expansion members may be used. In one aspect, a number of frame expansion members for a particular application can depend in part upon the amount of expansion and contraction capabilities desired for a particular application, such as for a particular wind turbine tower. Although the system can operate with a single frame expansion member and/or single frame expansion section, multiple expansion sections, as in FIG. 2, can facilitate a more even and stable expansion and contraction of the frame.

Figure 4:
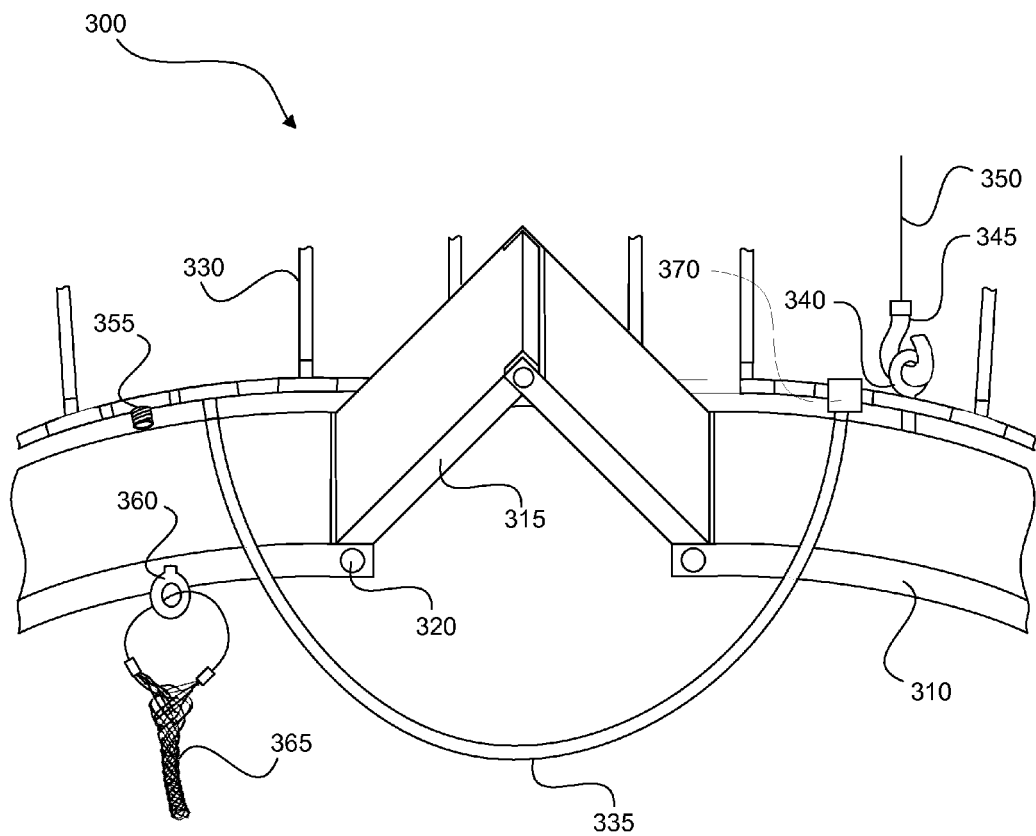
FIG. 4 is a bottom perspective view of a portion of a side of a wind turbine tower cleaning or coating apparatus, in accordance with an embodiment of the present disclosure.

Reference will now be made to FIG. 4, which illustrates a bottom perspective view of a portion of a side of a wind turbine tower cleaning or coating apparatus 300, in accordance with an embodiment of the present disclosure. The apparatus of FIG. 4 uses the pivoting frame expansion members 315 as described above in FIG. 2. The pivoting frame expansion members are operably attached to the frame 310 using pivot members 320. Sprayers 330 are not fully depicted in the view provided in FIG. 4 and are attached to a pipe 325. The pipe can in turn be attached to the frame. Fluid can be supplied to the sprayer using the pipe. The frame expansion members are positioned at an expansion section of the frame. To enable expansion of the frame while supplying fluid to the apparatus from a single source, a flexible tube can connect pipe sections near the expansion section to allow the frame to circumferentially expand and contract without disrupting the supply of fluid to the sprayer. Supplying fluid to the apparatus from a single source is not required. However, using a plurality of sources or hoses attached to the pipe can be cumbersome and cause additional difficulties. The flexible tube solution can work with a variety of frame expansion schemes and allow for use of a single fluid source to supply fluid for all of the sprayers on the apparatus.

The hose can be attached to the pipe 325 using any suitable hose connection means. In one aspect, the hose is attached using a hose screw connection 355 on the pipe. The hose can be screwed onto the hose screw connection to secure the hose to the pipe. As an additional safety feature, the hose can be secured to the frame of the apparatus. For example, the apparatus may include a cylindrically braided safety device 365 configured to allow the hose to pass therethrough. The cylindrically braided safety device can prevent the hose from falling to the ground if the hose disconnects from the pipe. Generally, the hose will remain securely attached to the pipe and the cylindrical braid may simply be a backup safety device in case of failure of the attachment between the hose and the pipe. The safety device can prevent an event which may otherwise cause significant injury to persons or property on the ground beneath a hose falling from a significant height. In one aspect, the cylindrical braid can be attached to the frame using an attachment means 360. FIG. 4 depicts the attachment means as a loop, although any other form of loop, hook, screw, or any of a myriad of other attachment means may also be used. The cylindrical braid can provide a larger cylindrical diameter when compressed, or not stretched, to enable the hose to pass through. However, when the cylindrical braid is stretched or pulled, such as may be the case if the hose started to fall, the cylindrical diameter contracts and can tighten the braid around the hose to arrest the movement of the hose.

The frame may be raised and lowered along the height or vertical direction of the wind turbine tower by any of a variety of means as are known in the art. The embodiment of FIG. 4 illustrates a means for moving the frame along the height of the tower. A loop 340 is attached to the frame 310 and a hook 345 passes therethrough. The hook 345 can be connected to a cable 350 which extends to the top of the tower and by which the frame is lowered and raised. Any other various means of attaching the frame to a means for moving the frame along the height of the tower may also be used, as would be understood by one having skill in the art. Any number of attachments may be made to the frame to facilitate raising and lowering the frame.

Also shown in FIG. 4 is a valve 370 or plurality of valves, such as a solenoid valve, which can be used to shut down a first portion of the sprayer nozzles or a second portion of the sprayer nozzles, or both (or a third portion, a fourth portion, etc.). For example, if the water pressure is low, then the second portion of the sprayers can be shut down so that higher pressure can be delivered to the remaining sprayers. Alternatively or sequentially, the first portion of the sprayers can be shut down so that the second portion of the sprayers can be activated for use. Thus, any group of sprayers can be configured with appropriately positioned valves to form zones of sprayers. Such zones can be regional (positioned together to form a common zone), or interlaced (positioned every second or every third sprayer to form a common zone). Valves can be opened or closed to isolate one or more zones using any technique known in the art, such as pre-programming, use of timers, use of RF remote control devices, or the like.

Figure 5:
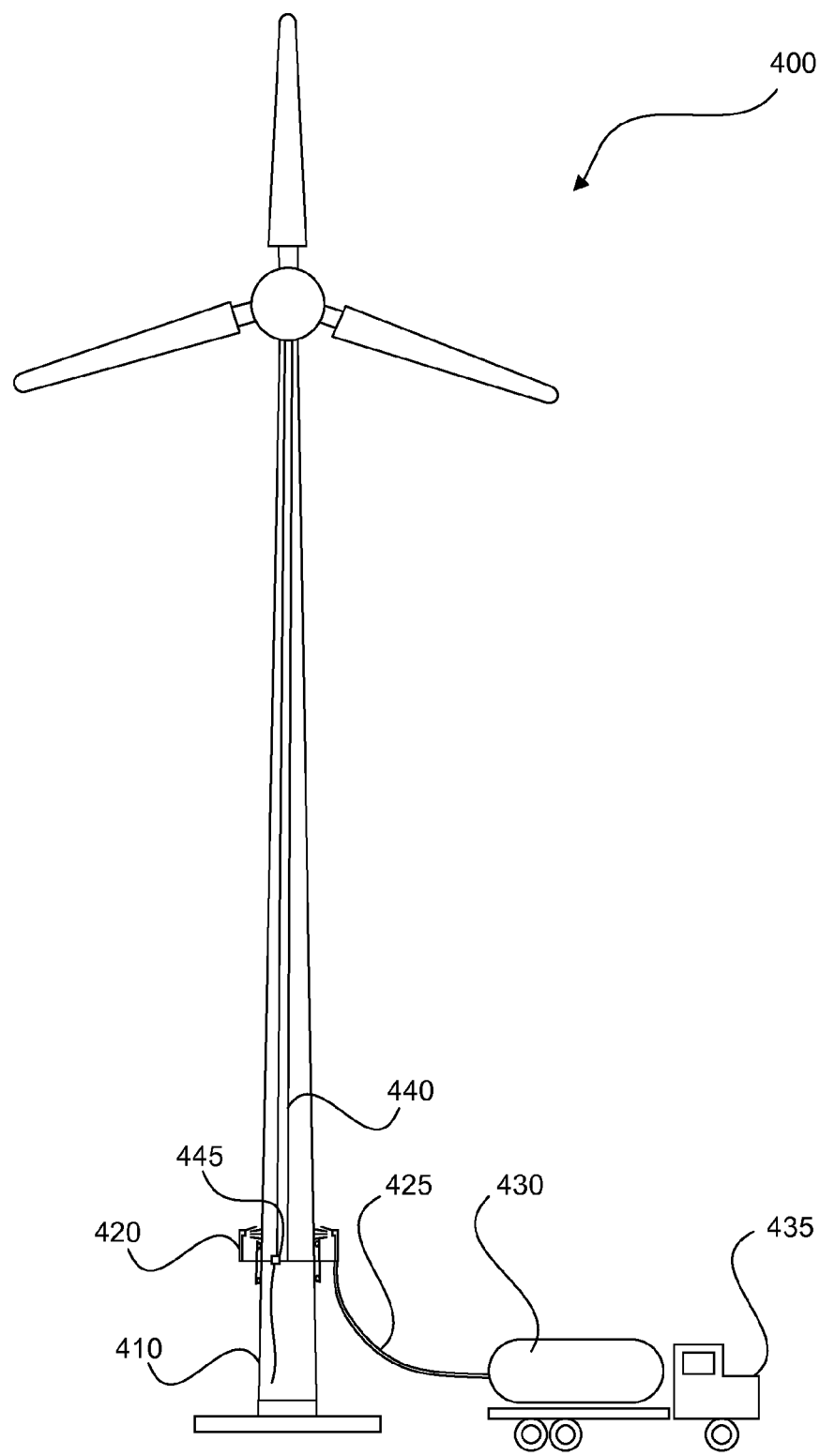
FIG. 5 is a front view of a wind turbine tower being cleaned or coated with a wind turbine tower cleaning or coating apparatus, in accordance with an embodiment of the present disclosure.

Reference will now be made to FIG. 5, which illustrates a front view 400 of a wind turbine tower 410 being cleaned or coated with a wind turbine tower cleaning or coating apparatus 420, in accordance with an embodiment of the present disclosure. The wind turbine tower cleaning or coating apparatus may comprise an apparatus such as those described above in any of FIGS. 1-4 or combinations of embodiments described therein. FIG. 5 depicts a utility vehicle 435 carrying a fluid reservoir 430. The fluid reservoir can include a plurality of fluid reservoirs for supplying a plurality of fluid types, such as water, cleaning solution, etc. A hose 425 extends from the fluid reservoir to the cleaning or coating apparatus 420. FIG. 5 illustrates a mechanism by which the cleaning or coating apparatus can be raised and lowered along the height of the wind turbine tower. A cable 440 extends from the cleaning or coating apparatus up to a top of the wind turbine tower, such as to or near the nacelle, and then extends downwardly toward a rope/cable climber or hoist 445 that is attached to the frame. A pulley or similar system can be used at the top of the wind turbine tower to facilitate movement of the cable as the cleaning or coating apparatus is raised and lowered. By using a hoist, a separate winch or other similar device that is next to the wind turbine tower (such as on an adjacent truck) need not be used. Thus, in this embodiment, only the fluid hose is connected to a separate unit, such as a utility vehicle, though other connections to a separate unit or vehicle is not precluded, e.g., providing power to remote control device, providing power to the hoist, etc.

Figure 6:
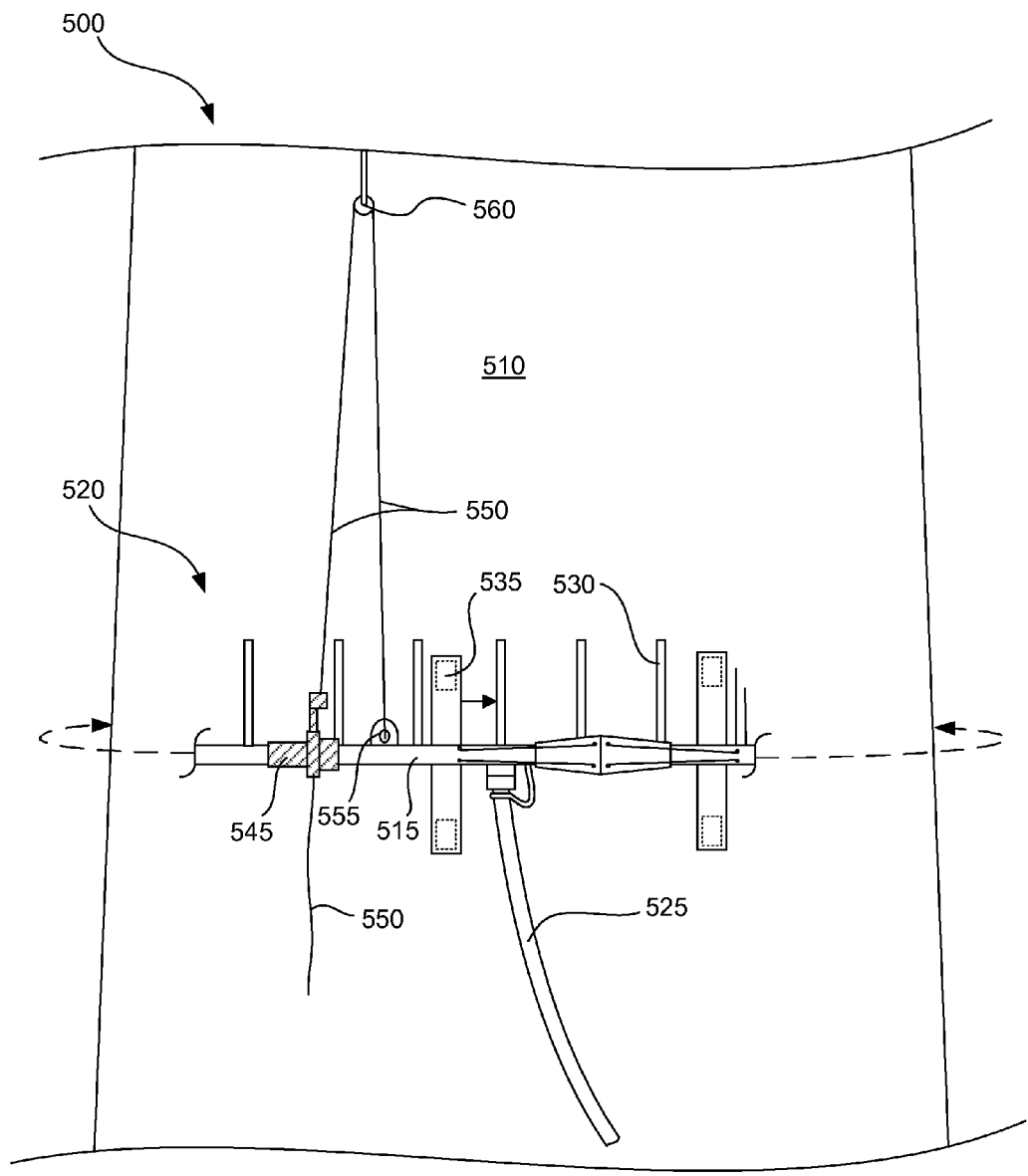
FIG. 6 is a partial view of a wind turbine cleaning or coating apparatus that utilizes a hoist or rope/cable climber attached to the frame in accordance with an embodiment of the present disclosure.

Turning now to FIG. 6, this FIG. sets forth a partial view 500 of a wind turbine tower 510 being cleaned with a wind turbine tower cleaning or coating apparatus 520, in accordance with an embodiment of the present disclosure. Here, only a portion of the wind turbine tower cleaning or coating device is shown, but this embodiment can include any apparatus structure described herein, such as those described above in any of FIGS. 1-5, or any variant of which would be apparent to one having skill in the art after considering the present disclosure. More specifically, FIG. 6 depicts a plurality of sprayers 530 supplied by a hose 525 that extends from the fluid reservoir to the cleaning or coating apparatus. Sliders or rollers 535 are positioned on a frame 515 (note the pivot frame with restraining members described in FIG. 2 being part of the frame in this embodiment) that moves upwardly and downwardly along the wind turbine tower, as previously described. Unique to this embodiment and that shown in FIG. 5 is the presence of a hoist 545, also known as a rope/cable climber device, attached to the frame. In this configuration, an external winch device attached to a utility vehicle is not needed. Rather, a rope 550 is attached to an eyelet 555, passed through a pulley system 560 at or near the top of the wind turbine, and fed through the hoist device to mechanically raise and lower the apparatus. Suitable hoists that can be used include those available from Skyclimber®, such as the Compact 1000, Compact 1250, or the Compact 1500. These particular hoists are suitable for use with heavy loads, and can be included with radio frequency remote control systems to control the direction of climb or lowering. These types of devices use "wire rope," but other devices that use different cables, ropes, chains, etc., can also be used.

As described, a wind turbine lift apparatus is provided which may be used for maintenance other than just cleaning. For example, the lift apparatus may be configured to raise and lower maintenance workers, tools, wind turbine parts, or may include other features such as cameras for inspection of the wind turbine. The apparatus can include a frame configured to circumferentially extend at least partially around a wind turbine tower. The frame can include a frame expansion member coupled to the frame and configured to enable an expansion and contraction of a circumference of the frame. A restraining device can extend between the frame and the frame expansion member and can cause the frame to expand and contract based on a diameter of the wind turbine tower. A slider can be attached to the frame and can slide on the surface of the wind turbine tower as the frame is raised and lowered on the wind turbine tower. A frame lift device, such as those described above, can be used to raise and lower the frame on the wind turbine tower.

Figure 7:
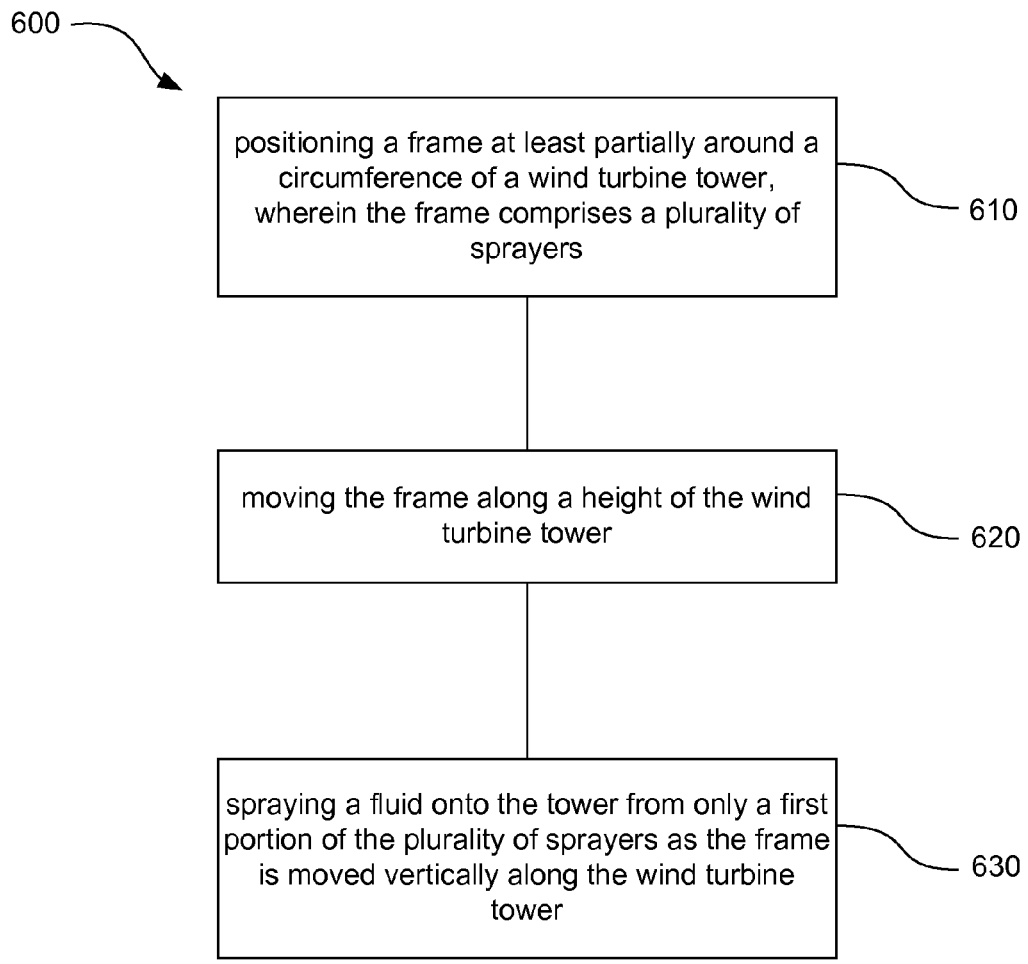
FIG. 7 is a diagram of a method in accordance with an embodiment of the present disclosure.

FIG. 7 is a flow diagram of a method 600 for cleaning, treating, or painting a wind turbine tower, in accordance with an embodiment. The method includes positioning 610 a frame at least partially around a circumference of a wind turbine tower, wherein the frame comprises a plurality of sprayers; moving 620 the frame along a height of the wind turbine tower; and spraying 630 a fluid onto the tower from only a first portion of the plurality of sprayers as the frame is moved vertically along the wind turbine tower. In this embodiment, the method can further comprise the step of spraying the fluid onto the tower from a second portion of the plurality of sprayers. This step can further include the additional step of shutting off one or more sprayer from the first portion of the plurality of sprayers. As with some other embodiments herein, the method can further comprise using a hoist attached to the frame to move the frame along the wind turbine tower.

Optionally, with respect to the cleaning embodiment, a rinsing fluid can be applied as well on a different pass of the apparatus. The method can be accomplished without a single maintenance worker on the frame or on the tower. In other words, the method can enable an automatic wind turbine tower wash. The method may be varied by spraying only a rinse or only a treatment or cleaning solution onto the tower or by spraying both the rinse and the treatment solution simultaneously at offset heights.

In one aspect, the same sprayer(s) may be used to spray different kinds of fluid onto the tower. In another aspect, different sprayers can be used to spray different kinds of fluid onto the tower. For example, a set of sprayers may be used to spray a cleaning solution onto the tower and a different set of sprayers may be used to spray a water rinse onto the tower. Alternatively, paint sprayers may be used when painting the tower, or other types of sprayers may be used when applying certain types of treatments, e.g., polymeric coatings, sealants, etc.

The method can further include adjusting a circumference of the frame automatically according to a diameter of the wind turbine tower as the frame is moved along the height of the wind turbine tower. For example, the circumference of the frame may be automatically adjusted by telescopically expanding or contracting the frame. As another example, the circumference of the frame may be automatically adjusted by expanding or contracting the frame using pivoting frame expansion members.

The systems and methods described herein can be used to reduce a cost of wind turbine tower cleaning and maintenance, as well as reduce time expended in cleaning and difficulty and hazards encountered in cleaning wind turbine towers. Also, while the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A wind turbine tower cleaning or coating apparatus, comprising:
   a frame configured to circumferentially extend at least partially around a wind turbine tower;
   a separator structure attached to the frame and configured to extend between the frame and the wind turbine tower to position the frame a predetermined distance away from the wind turbine tower, the separator structure comprising an attachment end attached to the frame and a traversing end positionable near the wind turbine tower;
   a slider or roller attached to the traversing end of the separator structure and configured to slide or roll, respectively, along the surface of the wind turbine tower as the frame is raised and lowered on the wind turbine tower;
   a frame lift device configured to raise and lower the frame on the wind turbine tower; and
   a plurality of sprayers positioned circumferentially along the frame and configured such that a portion of the plurality of sprayers can be shut off while leaving another portion of the plurality of sprayers active in order to selectively spray fluid onto the wind turbine tower.

2. An apparatus in accordance with claim 1, further comprising a hoist attached to the frame configured to raise and lower the frame on the wind turbine tower.

3. An apparatus in accordance with claim 1, wherein the fluid is water, a cleaning fluid, a treatment fluid, or paint.

4. An apparatus in accordance with claim 1, further comprising a base to support the frame when the frame is not raised.

5. An apparatus in accordance with claim 1, wherein the frame further comprises:
   a plurality of pivot frame members extending outwardly from the frame away from a position of the wind turbine tower;
   a plurality of pivots operably attaching the pivot frame members to the frame and configured to enable the pivot frame members to pivot such that the frame is circumferentially expandable and contractable; and
   a restraining device extending between the frame and at least one of the pivot frame members and configured to cause the frame to expand and contract based on a diameter of the wind turbine tower.

6. An apparatus in accordance with claim 1, wherein the frame further comprises:
   a frame expansion member coupled to the frame and configured to enable an expansion and contraction of a circumference of the frame; and
   a restraining device extending between the frame extension member and elsewhere on the frame, and configured to allow the frame to expand and cause the frame to contract based on a diameter of the wind turbine tower.

7. An apparatus in accordance with claim 1, wherein the sprayers further comprise a pipe attached to the frame through which fluid is supplied to the sprayers and the apparatus further comprises a flexible tube connecting pipe sections near the expansion member to allow the frame to circumferentially expand and contract without disrupting the supply of fluid to the sprayer.

8. An apparatus in accordance with claim 1, wherein the plurality of sprayers are connected to one another through a pipe or tubing, and wherein one or more valve is placed along the pipe or tubing.

9. An apparatus in accordance with claim 8, wherein the one or more valve is pre-programmed, controlled by a timer, or controlled by a radio frequency remote controller.

10. An apparatus in accordance with claim 1, further comprising a camera supported by the frame.

* * * * *